(12) United States Patent
Veno et al.

(10) Patent No.: US 7,040,564 B1
(45) Date of Patent: May 9, 2006

(54) CARTRIDGE REEL WITH INTERNAL REEL ASSEMBLY LOCK

(75) Inventors: William T. Veno, Thornton, CO (US); Phillip M. Morgan, Berthoud, CO (US)

(73) Assignee: Storage Technology Corporation, Louisville, CO (US)

( * ) Notice: Subject to any disclaimer, the term of this patent is extended or adjusted under 35 U.S.C. 154(b) by 207 days.

(21) Appl. No.: 10/746,726

(22) Filed: Dec. 26, 2003

(51) Int. Cl.
*G11B 23/04* (2006.01)

(52) U.S. Cl. .................... 242/338.1; 360/132
(58) Field of Classification Search ............ 242/338.1, 242/338.3, 343; 360/132
See application file for complete search history.

(56) References Cited

U.S. PATENT DOCUMENTS 4,555,077 A * 11/1985 Platter et al. ............ 242/338.1
4,802,633 A * 2/1989 Beery ...................... 242/338.1
6,273,352 B1    8/2001 Johnson et al.
6,452,747 B1    9/2002 Johnson et al.

\* cited by examiner

*Primary Examiner*—John Q. Nguyen
(74) *Attorney, Agent, or Firm*—Brooks Kushman P.C.

(57) ABSTRACT

A data storage tape cartridge for a high speed tape drive. The tape cartridge encloses the tape reel having a drive hub that defines a reel lock. A ring of beveled gear teeth on the tape reel engage a ring of beveled gear teeth affixed to the tape cartridge for locking the reel to the cartridge. A spring biases the teeth into engagement. When the data storage tape cartridge is inserted into a data storage system, a drive hub engages the tape reel to shift the tape reel relative to the tape cartridge and disengage the rings of beveled gear teeth. In the same motion, the tape reel is centered within the data storage tape cartridge and a hub engagement member is lifted off of a flange of the tape reel.

14 Claims, 2 Drawing Sheets

CARTRIDGE REEL WITH INTERNAL REEL ASSEMBLY LOCK

BACKGROUND OF THE INVENTION

1. Field of the Invention

The present invention relates to a data storage tape drive system having a locking mechanism for locking the reel within the tape cartridge when the tape cartridge is not in a tape drive system.

2. Background Art

Data storage tape drive systems are used to store large volumes of information for subsequent retrieval and use. Data storage tape drive systems are used to store computer data, audio files, and video files.

Data storage tape drive systems generally include interchangeable data storage tape cartridges that are selectively loaded into a tape drive system to store or retrieve data. Data storage tape cartridges generally include a housing, a tape reel, and magnetic storage tape that is wound on the tape reel. Tape drive systems generally include one or more drive hubs that are configured to operatively engage the data storage tape cartridge and rotate the tape reel. The drive hub is driven by a drive motor in a controlled manner so that transducers such as magnetic read/write heads record or read data on the storage tape.

Some tape drive systems are designed to use single reel data storage tape cartridges that interact with the tape drive system by allowing tape to be fed from the cartridge to a reel that is part of the tape drive system and outside the data tape storage cartridge. Another type of tape cartridge uses a dual tape reel configuration. With either type of cartridge, it is preferred to lock the tape reels to the cartridge housing when the cartridge is not disposed in the tape drive system. To lock a tape reel within a cartridge, a brake assembly or lock may be provided for each tape reel. The brake body generally includes a first portion engaging the tape cartridge housing and a second portion engaging the tape reel. The cartridge engagement portion may be connected to the cartridge housing in a sliding relationship in which an inwardly extending tab is received in a slot. The tape reel engagement portion of the brake is selectively connected to the tape reel. The tape reel engagement portion has a plurality of teeth that are oriented to engage a corresponding set of teeth on the tape reel in a locked position. A spring is provided to bias the brake body into its locked position.

When the tape cartridge is placed in the tape drive system, the brake body is moved out of its locked position to allow the tape reel to rotate. The tape reel is normally rotated by a drive hub that shifts the brake body from its locked position to an unlocked position.

While the above system is widely accepted, improvements in tape drive technology enabling tape drive systems to operate at higher tape speed have necessitated higher drive chuck rotational rates. Potential problems arise when higher drive hub speeds are achieved. Higher hub rotation speeds may cause increased friction and heat stress on the brake body components.

Another proposed solution is disclosed in U.S. Pat. No. 6,452,747 that discloses a data storage tape cartridge that is better suited for high speed operation. The disclosed data storage tape cartridge includes a housing, a tape reel, a storage tape, a brake, and a spring. The brake body is disposed in the central bore of the tape reel and includes a stem, a reel engagement section, and a wear button. The stem is attached in a sliding relationship to a receiver associated with a first housing section. The reel engagement section is configured to selectively engage a portion of the tape reel in a locked position with the concentric ring of teeth facing in an axial direction. The wear button is engaged by the drive hub of the tape drive system to unlock the brake by shifting the brake body out of its locked position. The spring biases the brake body into its locked position causing the brake body to rigidly connect the tape reel to the housing. To reduce friction in this system, a bearing ball on the drive hub contacts and rotates with a surface, concave or otherwise, of the brake body. According to this arrangement, thermal and frictional forces are minimized at high tape speeds. A disadvantage of this system is that substantial travel is required to shift the brake body against the spring to release the teeth on the brake body from the teeth of the tape reel. The brake body must move more than the full depth of the engagement teeth to unlock the reel from the cartridge. Approximately 0.060 of an inch movement is required to lift the brake body off of the teeth and an additional 0.060 of an inch is required for centering the reel in the cartridge. With half height drives, even less space is available for locking and unlocking the brake mechanism and for centering the reel within the cartridge. In addition, half height drives normally have a reduced range of elevator travel.

Accordingly, a need exists for a data storage tape cartridge for a tape drive system that reduces the amount of travel required for unlocking and locking the reel. There is also a need for reducing the amount of movement required to center the reel for threading into the tape drive system for single reel data storage tape cartridges. By reducing the amount of travel required, the quality and reliability of the tape drive system and data storage tape cartridge can be increased. Less movement of the reel and brake within the cartridge will result in less alignment problems and fewer problems relating to drive run outs.

SUMMARY OF THE INVENTION

According to one aspect of the present invention, a data storage tape cartridge for a tape drive system is provided that has a locking mechanism for locking a tape reel to a tape cartridge and that requires less travel to lock and unlock the tape reel. The cartridge comprises a housing with a first section having a central boss and a second section that is assembled to the first section and has an opening in alignment with the central boss. A tape reel including first and second spaced flanges and a cylindrical hub on which a magnetic tape is wound extends between the first and second flanges. The hub of the tape reel is received over the central boss of the first section of the housing in a spaced relationship. A reel lock stabilizes the tape reel and comprises a first ring of teeth formed on an inner diameter of the first flange and a second ring of teeth fixed to the central boss. The first and second rings of teeth are axially movable relative to each other. A drive hub engaging member is assembled between the first and the second flange and is biased toward the second flange. The drive hub engaging member is assembled to the central boss to be axially movable relative to the central boss. The second ring of teeth is fixed to the first section of the housing. A spring biases the tape reel and drive hub engaging member to hold the first ring of teeth in engagement with the second ring of teeth. The drive hub engaging member is adapted to be contacted by the drive hub of the tape drive system so that the drive hub shifts the drive hub engaging member against the biasing force of the spring to disengage the first ring of teeth from the second ring of teeth.

According to other aspects of the invention, the second ring of teeth may be formed on an annular member that is attached to the central boss of the first housing section. The drive hub engaging member may further comprise a disk having a tubular ring on the side of the disk facing the central boss that is proportioned to receive the end of the central boss in a sliding relationship within the tubular ring. A wear button is formed on the opposite side of the disk from the tubular ring. The tape cartridge may further comprise a washer provided on the side of the second flange of the reel facing the drive hub. The spring may engage the annular member on a first end and engage the disk on a second end at a location radially outboard of the tubular ring.

According to other aspects of the invention, the first and second rings of teeth are complementary sets of beveled gear teeth. The first ring of teeth are preferably formed on the inner diameter of the first flange of the tape reel and, in accordance with one embodiment of the invention, are inclined at approximately a 45° angle relative to the axis of rotation of the tape reel. The second ring of teeth are outwardly directed teeth formed on a circular member attached to the central boss. The second ring of teeth, in accordance with one embodiment of the invention, are also beveled gear teeth oriented at a 45° angle relative to the axis of rotation of the tape reel. The inwardly directed first ring of teeth and the outwardly directed second ring of teeth may be engaged and disengaged within a minimum range of movement. The extent of travel of the tape reel within the cartridge is limited by the spacing between the end of the central boss and the drive hub engaging member. In this way, the reel may be both unlocked and centered relative to the cartridge in the same movement.

Other aspects of the invention will be better understood in view of the attached drawings and following detailed description of a preferred embodiment of the invention.

DETAILED DESCRIPTION OF THE PREFERRED EMBODIMENT(S)

Figure 1:
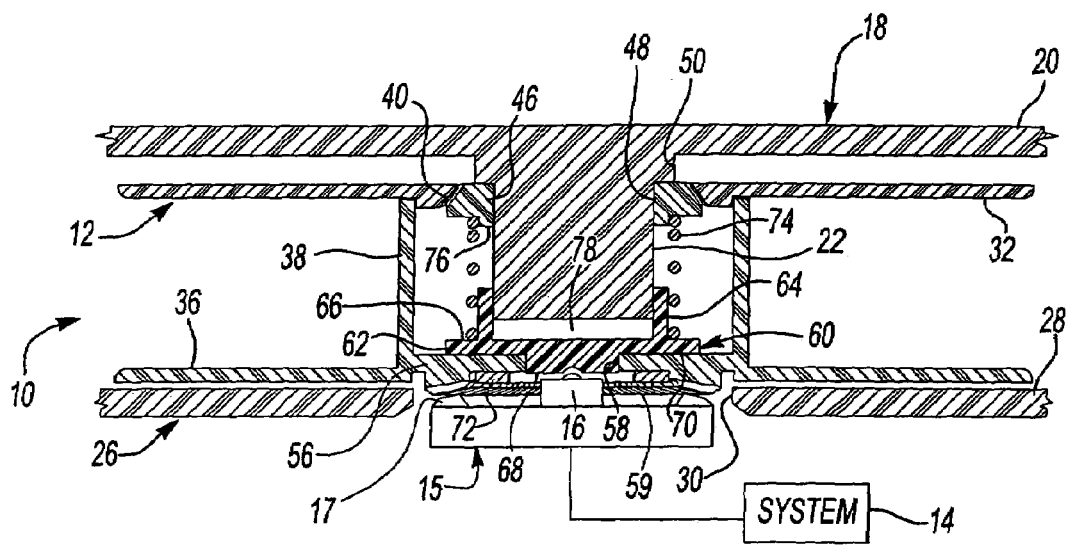
FIG. 1 is a fragmentary cross-sectional view of the data storage tape cartridge showing a housing and a tape reel in a locked position.

Referring to FIG. 1, a data storage tape cartridge 10 is shown in a fragmentary view. The data storage tape cartridge 10 is of the single reel type and is normally provided as a flat, rectangular, box-shaped cartridge. A tape reel 12 is provided within the tape cartridge 10. The data storage tape cartridge 10 is designed to be used with a data storage system 14 that is diagrammatically represented in FIG. 1 by the box labeled "system". The system 14 includes a drive hub 15 that is driven by a motor as is well known in the art. The drive hub 15 includes a reel contact member 16 and a plurality of gear teeth 17.

The data storage tape cartridge 10 includes a housing that is molded in two parts. A first housing part generally referred to by reference numeral 18 includes a first wall 20 and a central boss 22. The second housing part includes a second wall 28 of the tape cartridge 10 that defines a central aperture 30 that is coaxially aligned with the central boss 22.

The tape reel 12 has a first flange 32 and a second flange 36 that are interconnected by a hub 38. The hub 38 is formed as part of the second flange 36 and is ultrasonically welded or otherwise connected to the first flange 32 so that the first and second flanges 32 and 36 are spaced from each other. A magnetic data storage tape is wound on the hub 38 between the first and second flanges 32 and 36, as is well known in the art.

An inner portion 40 of the first flange 32 has a ring of beveled gear teeth 42 formed on its inner periphery. The ring of beveled gear teeth 42 are disposed at approximately a 45° angle relative to an axis of rotation of the tape reel 12.

An annular member 46 defines a central opening 48. Annular member 46 is assembled to the central boss 22 and is retained by the spring biasing force or retaining snap features that secure the annular member 46 to the central boss 22. A shoulder 50 is provided on the central boss 22 and abuts the annular member 46 to hold the annular member 46 in a spaced relationship relative to the first wall 20 of the first housing part 18. The annular member 46 has a ring of beveled gear teeth 52 on the outer periphery 54 of the annular member 46. The ring of beveled gear teeth 52 are disposed at a 45° angle relative to the axis of rotation of the tape reel 12 and are oriented to mesh with the ring of beveled gear teeth 42 on the inner portion 40 of the first flange 32. An inner extension 56 of the second flange 36 defines an access opening 58 that provides access to the tape reel 12 within the tape cartridge 10. A plurality of teeth 59 are provided on the lower surface of the inner extension that are engaged by the teeth 17 of the drive hub 15. A hub engaging member 60 is accessible through the access opening 58. Hub engaging member 60 includes a disk 62 having an integral tubular ring 64 on an inner side 66 and an integral wear button 68 on an outer side 70 thereof.

The wear button 68 is contacted by the reel contact member 16 of the drive hub 15 of the data storage system 14. When the wear button 68 is contacted by the reel contact member 16, the tape reel 12 shifts from the position shown in FIG. 1 to the position shown in FIG. 2. The hub contacting member 60 is lifted off of the reel 12. A washer 72 is provided around the access opening 58 on the second flange 36 of the tape reel 12.

A spring 74 is assembled over a circular rib 76 that is formed on the annular member 46 and also engages the hub engaging member 60 adjacent to tubular ring 64 thereof. The spring 74 biases the tape reel 12 away from the first wall 20 of the first housing part 18 and toward the second wall 28 of the second housing part 26. When the tape cartridge 10 is not in the data storage system 16, the spring 74 causes the tape reel 12 to move toward the second wall 28 until the ring of beveled gear teeth 42 of the inner portion 40 of the first flange 32 engage the ring of beveled gear teeth 52 formed on the outer periphery 54 of the annular member 46. This is the arrangement illustrated in FIG. 1. A gap 78 is formed between the central boss 22 and the disk 62 when the rings of beveled gear teeth 42 and 52 are engaged to lock the tape reel 12 within the data storage tape cartridge 10.

Figure 2:
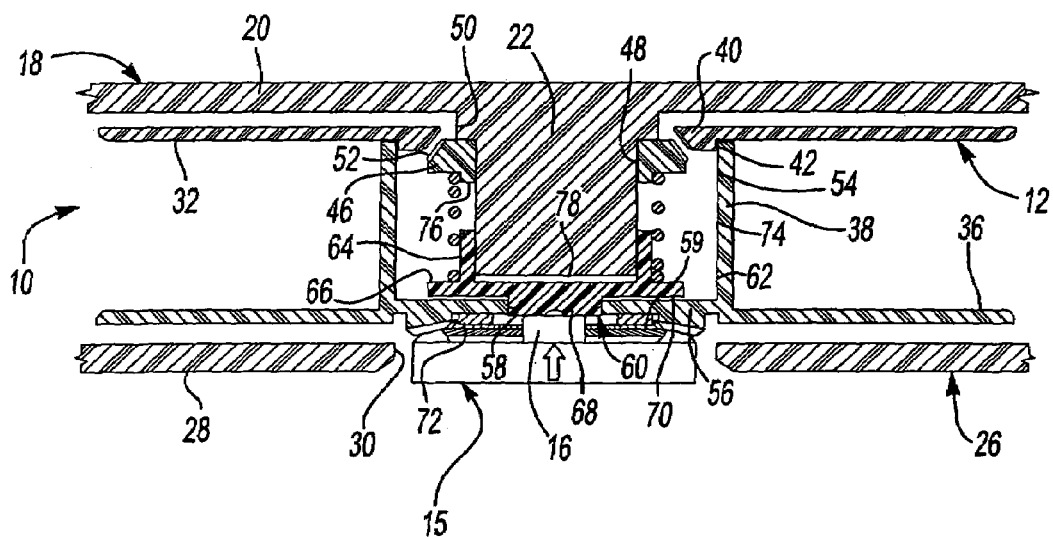
FIG. 2 is a fragmentary cross-sectional view of the data storage tape cartridge showing a housing and a tape reel in an unlocked position with the tape reel centered.

Referring to FIG. 2, data storage tape cartridge 10 is shown as it would appear when loaded into a data storage system 14 with a drive hub 15 exerting pressure shown by the arrow in FIG. 2 upwardly against the biasing force of the spring 74 the hub engaging member 60 is lifted off of the rib of the lower flange 56 . . . to disengage the ring of beveled gear teeth 42 from the ring of beveled gear teeth 52. The gear teeth 17 engage the teeth 59 to center the reel 12 relative to the cartridge 10. The gap 78 as shown in FIG. 2 is reduced to a minimum clearance. In the position shown in FIG. 2, the first and second flanges 32 and 36 of the tape reel 12 are centered relative to the first and second walls 20 and 28 of the tape cartridge 10. The tape reel 12 is free to rotate relative to the tape cartridge 10 as it is driven by the teeth 17 of the drive hub 15. The gear teeth 17 of the drive hub 15 engage the gear teeth 59 on the tape reel 12 and lift the tape reel off of the wall 28.

Figure 3:
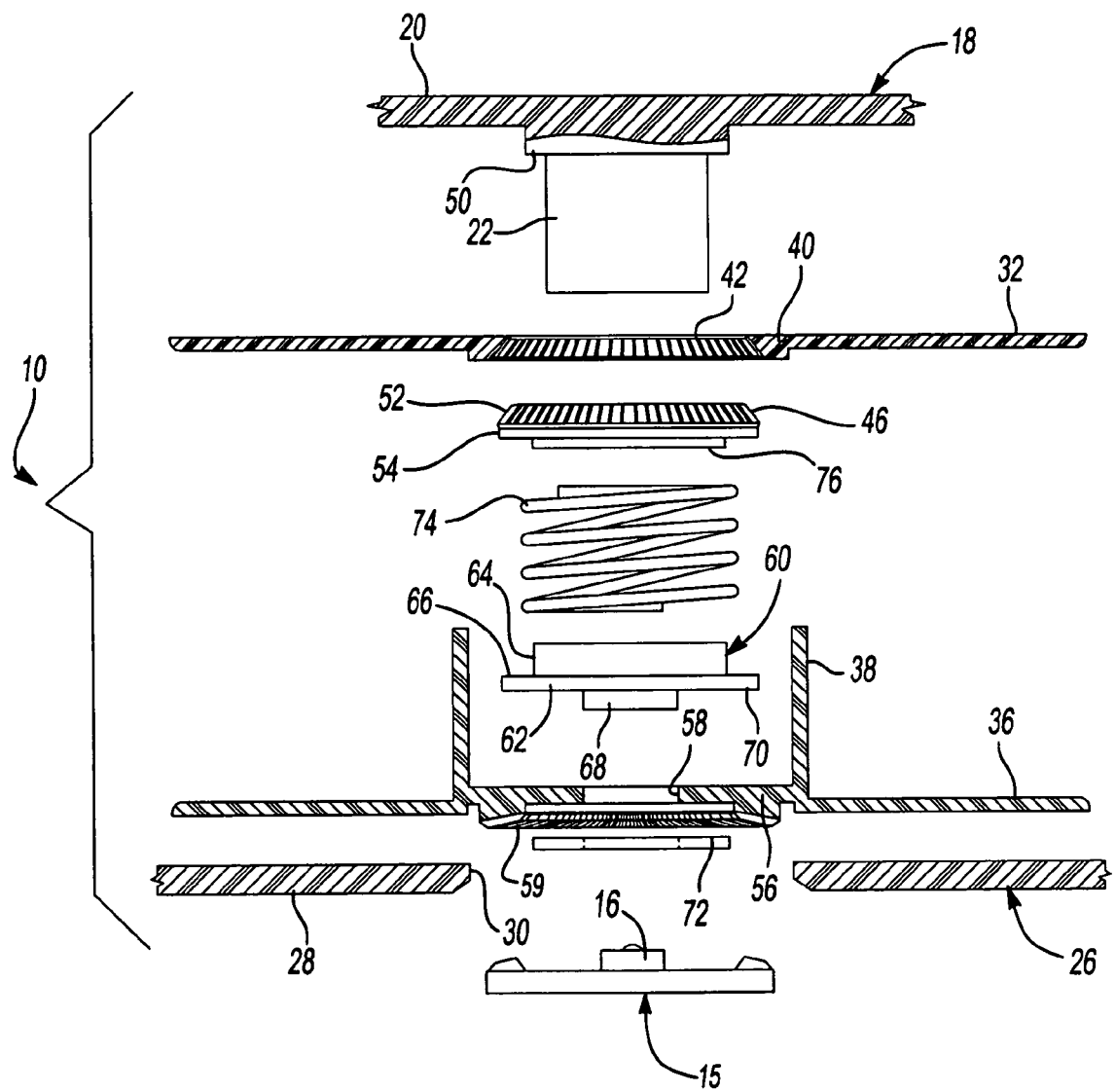
FIG. 3 is a fragmentary exploded cross-sectional view of the data storage tape cartridge.

Referring to FIG. 3, the data storage tape cartridge 10 is shown in an exploded perspective view. The tape reel is assembled by inserting the hub engaging member 60, spring 74, and annular member 46 inside the hub 38. The first flange 32 is ultrasonically welded to the ends of the hub 38 to join the first and second flanges 32 and 36 together. The tape reel 12 is then inserted inside the first housing part 18 and second housing part 26 with the central boss 22 extending through the annular member 46, spring 74, and hub engaging member 60. The wear button 68 is located within the access opening 58. The annular member 46 is located within hub 38 by the ring of beveled gear teeth 52 that are urged against the ring of beveled gear teeth 42 on the inner portion 40 of the first flange 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data storage tape cartridge for a tape drive system having a drive hub, the data storage tape cartridge comprising:
    a housing comprising a first section having a central boss and a second section assembled to the first section and having an opening in alignment with the central boss;
    a tape reel having an axis of rotation and including first and second spaced flanges and a cylindrical hub extending between the first and second flanges, a magnetic tape wound around the hub between the flanges, the hub of the reel being received over the central boss in a spaced relationship;
    a reel lock for stabilizing the tape reel, comprising a first ring of teeth formed on an inner diameter of the first flange, a second ring of teeth associated with the central boss, the first and second rings of teeth being axially moveable relative to each other, a drive hub engaging member biased toward the second flange and being assembled to the central boss and axially movable relative to the central boss, a spring engages the first section of the housing and biases the drive hub engaging member and tape reel to hold the first ring of teeth into engagement with the second ring of teeth, the drive hub engaging member is adapted to be contacted by the drive hub of the tape drive system, wherein the drive hub shifts the drive hub engaging member against the biasing force of the spring to lift the second flange thereby centering the tape reel and disengaging the first ring of teeth from the second ring of teeth.

2. The data storage tape cartridge of claim 1, wherein the second ring of teeth is formed on an annular member that is attached to the central boss.

3. The data storage tape cartridge of claim 1, wherein the drive hub engaging member further comprises a disk having an integral tubular ring on the side of the disk facing the central boss that is proportioned to receive the end of the central boss in a sliding relationship within the tubular ring, and an integral wear button formed on the opposite side of the disk from the tubular ring.

4. The data storage tape cartridge of claim 1, further comprising a washer that is provided on a side of the second flange of the reel facing the drive hub.

5. The data storage tape cartridge of claim 1, wherein the second ring of teeth is formed on an annular member that is retained on the central boss, and wherein the drive hub engaging member further comprises a disk having a tubular ring on the side of the disk facing the central boss that is proportioned to receive the end of the central boss in a sliding relationship within the tubular ring, and a wear button formed on the opposite side of the disk from the tubular ring, wherein the spring engages the annular member on a first end and engages the disk on a second end at a location radially outboard of the tubular ring.

6. The data storage tape cartridge of claim 1, wherein the second flange of the reel has an opening corresponding to the location of the opening in the housing through which the drive hub of the tape drive system contacts the drive hub engaging member.

7. The data storage tape cartridge of claim 1, wherein the first and second rings of teeth are complementary sets of beveled gear teeth.

8. The data storage tape cartridge of claim 7 wherein the first and second rings of teeth are disposed at a 45° angle relative to the axis of rotation of the tape reel.

9. The data storage tape cartridge of claim 1 wherein the spacing between the central boss and the drive hub engaging member permit relative travel between the tape reel and the housing.

10. The data storage tape cartridge of claim 1 wherein the first and second rings of teeth are disposed within the hub, the spring is disposed within the hub, and the drive hub engaging member is disposed within the hub.

11. A method of controlling a tape reel of a data storage tape cartridge that is engaged by a drive hub of a tape drive system through a hub engaging member, the tape reel and drive hub each being aligned on an axis of rotation, the tape reel having a first ring of teeth and the tape cartridge having a second ring of teeth, wherein first and second rings of teeth are coaxial with the axis of rotation, a spring assembled between the cartridge and the tape reel and exerting a biasing force on the tape reel to force the first ring of teeth into engagement with the second ring of teeth, the method comprising:
    locking the tape reel within the tape cartridge when the first and second rings of teeth engage each other as a result of the biasing force exerted by the spring;
    unlocking the tape reel relative to the tape cartridge by inserting the tape cartridge into a tape drive system with the drive hub engaging the hub engaging member that engages the tape reel to shift the tape reel axially within the tape cartridge and against the biasing force exerted by the spring to disengage the first and second sets of teeth from each other and thereby allow the tape reel to rotate freely relative to the tape cartridge wherein the hub engaging member is axially separated from the tape reel; and
    centering the tape reel within the tape cartridge by the same axial shifting of the tape reel as performed in the unlocking step.

12. The method of claim 11, wherein the first and second rings of teeth are beveled gear teeth.

13. The method of claim 11 wherein the drive hub has a plurality of teeth that engage a plurality of teeth formed on the tape reel.

14. The method of claim 13 wherein the centering step is performed by the engagement of the teeth on the drive hub with the teeth on the tape reel.

* * * * *